United States Patent
Vogel

(10) Patent No.: US 7,934,229 B1
(45) Date of Patent: Apr. 26, 2011

(54) GENERATING OPTIONS FOR REPAIRING A COMPUTER INFECTED WITH MALICIOUS SOFTWARE

(75) Inventor: Gregory D. Vogel, Chatsworth, CA (US)

(73) Assignee: Symantec Corporation, Cupertino, CA (US)

( * ) Notice: Subject to any disclaimer, the term of this patent is extended or adjusted under 35 U.S.C. 154(b) by 1285 days.

(21) Appl. No.: 11/323,388

(22) Filed: Dec. 29, 2005

(51) Int. Cl.
*G06F 11/00* (2006.01)

(52) U.S. Cl. ............... 725/24; 726/22; 726/23; 726/24; 726/25

(58) Field of Classification Search .............. 726/22–25; 713/150–181, 187–188; 707/200
See application file for complete search history.

(56) References Cited

U.S. PATENT DOCUMENTS

| | | | | |
|---|---|---|---|---|
| 6,067,410 | A * | 5/2000 | Nachenberg | 703/28 |
| 7,409,717 | B1 * | 8/2008 | Szor | 726/24 |
| 2002/0144129 | A1 * | 10/2002 | Malivanchuk et al. | 713/188 |
| 2002/0174137 | A1 * | 11/2002 | Wolff et al. | 707/200 |
| 2006/0130141 | A1 * | 6/2006 | Kramer et al. | 726/23 |
| 2006/0130144 | A1 * | 6/2006 | Wernicke | 726/24 |
| 2006/0179484 | A1 * | 8/2006 | Scrimsher et al. | 726/23 |
| 2006/0230449 | A1 * | 10/2006 | Fox et al. | 726/22 |
| 2007/0101432 | A1 * | 5/2007 | Carpenter | 726/25 |
| 2007/0143843 | A1 * | 6/2007 | Nason et al. | 726/22 |

OTHER PUBLICATIONS

F-Secure® Free Virus Removal Tools, [online] [Retrieved on Mar. 31, 2006] Retrieved from the Internet<URL:http://www.f-secure.com/download-purchase/tools/shtml>.

Zinman, A., "Treating Infected Systems," Feb. 17, 2005, WindowSecurity.com, [online] [Retrieved on Mar. 31, 2006] Retrieved from the Internet<URL:http://www.windowsecurity.com/articles/Treating-Infected-Systems.html>.

* cited by examiner

*Primary Examiner* — Brandon S Hoffman
*Assistant Examiner* — Hee Song
(74) *Attorney, Agent, or Firm* — Fenwick & West LLP

(57) ABSTRACT

A security module interfaces with a set of infection repair modules. Each repair module can perform a specific repair of an infection. Some of the repair modules utilize context information about the computer, such as the availability of a non-infected backup file. Further, the repairs performed by some repair modules are fine-grained while repairs of other repair modules are coarse-grained. The security module identifies malicious software infecting a computer and generates an infection object for each infection. The security module selectively routes the infection objects to the repair modules. In response, the repair modules provide repair objects representing repairs that the repair modules can perform on the infection. The repair objects have scores describing their thoroughness and complexity. The security module ranks the repair objects based on their scores and selects certain repairs for repairing the malicious software infections.

18 Claims, 4 Drawing Sheets

GENERATING OPTIONS FOR REPAIRING A COMPUTER INFECTED WITH MALICIOUS SOFTWARE

BACKGROUND OF THE INVENTION

1. Field of the Invention

This invention pertains in general to computer security and in particular to repairing a computer infected with a computer virus or other malicious software.

2. Description of the Related Art

There is a wide variety of malicious software (malware) that can attack modern computers. Malware threats include computer viruses, worms, Trojan horse programs, spyware, and adware. The malware attacks a computer by making one or more alterations on the computer that enable the malware to function. Simple malware, such as a virus, can infect a computer by altering a file so that it infects other files when executed. More complex malware, such as spyware, can infect multiple aspects of the computer, such as registry keys, executing processes, and executable files.

Existing security software can detect malware infections and, in many instances, repair them. The security software contains basic knowledge about the infection methods used by different types of malware, and also contains knowledge of how to repair the computer by disabling and/or removing the malware. Since instances of the security software are typically executing on thousands or millions of computers, the repair knowledge contained therein generally represents the lowest common denominator approach to repairing the infection. For example, if the malware infects the computer by changing a file handler in the registry to point to the malware instead of to legitimate software, the security software can disable the malware by restoring the handler to its default value. This approach is likely to work across all of the computers on which the security software is executing, because all of those computers are likely to support the default file handler.

The tradeoff of using the lowest common denominator approach is that the repairs performed by the security software are often suboptimal. For example, the computer might not have used the default file handler before the malware infection, meaning that the repair did not actually restore the computer to its original state. In some situations, context information that would enable the security software to make an optimal repair, such as information describing the location of a backup for an infected file, may be present on the computer.

Nevertheless, existing security software cannot take advantage of the context because there is no capability for making context information available to the security software, and the software correspondingly lacks the capability to analyze the context in order to make better repair decisions. As a result, there is a need for a way to leverage context information available on the computer to improve the repairs performed by security software.

BRIEF SUMMARY OF THE INVENTION

The above need is met by a security module that interfaces with repair modules. The repair modules utilize context information to provide repair options for the computer. Each repair module can perform a specific type of repair. At least some of the repair modules utilize context information about the computer for their repairs. The repairs performed by the repair modules can range from fine-grained, e.g., a surgical removal of infected code from a file, to coarse-grained, e.g., replacing an infected file with a clean version.

The security module identifies malicious software infecting the computer and generates an infection object for each infection. The security module selectively routes the infection objects to the repair modules. In response, the repair modules provide repair objects representing repairs that the repair modules can perform on the infections. The repair objects have scores describing their thoroughness and complexity. The security module sorts the repair objects based on their scores and selects certain repairs for repairing the malicious software infections.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
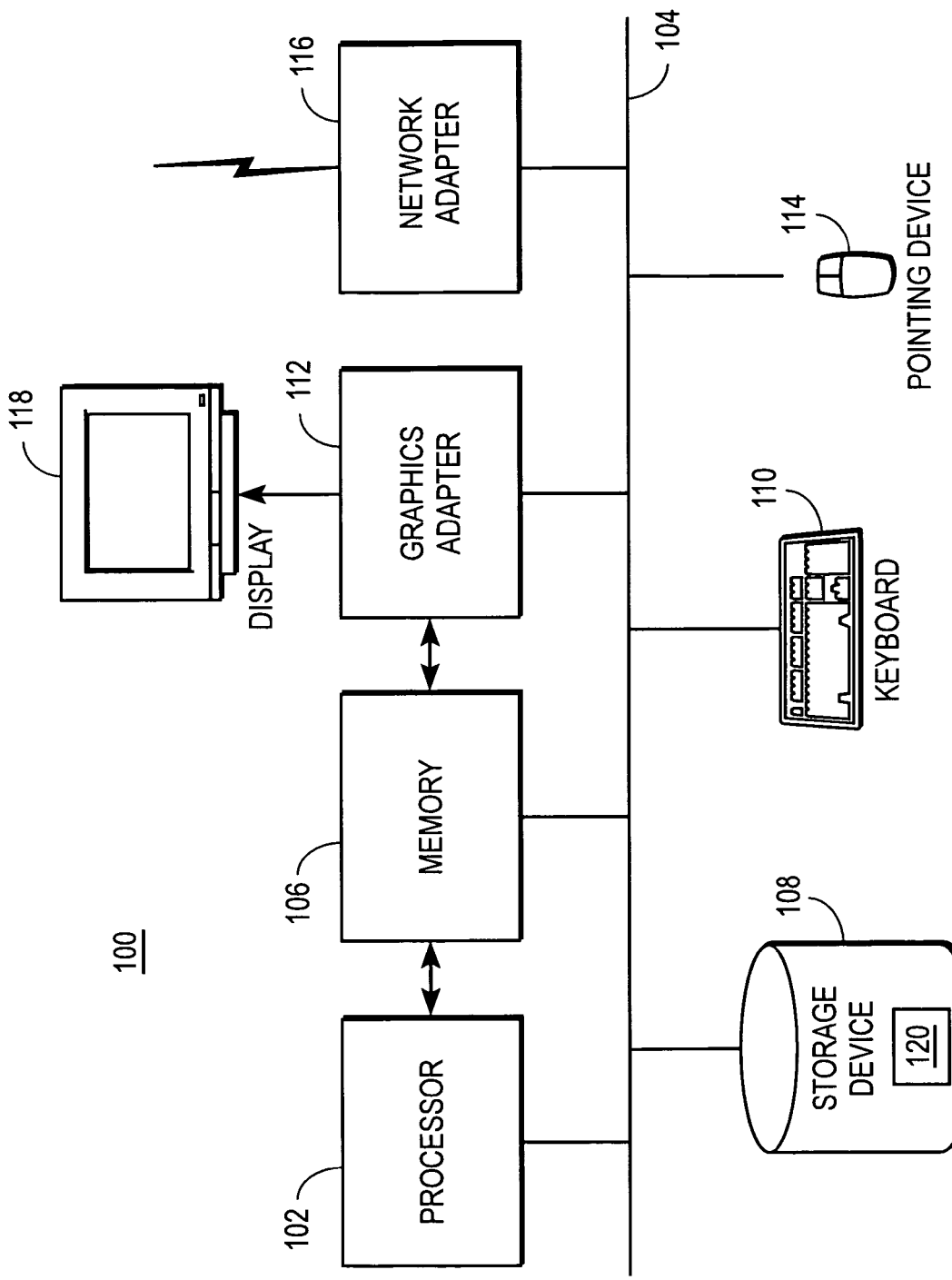
FIG. 1 is a high-level block diagram showing a computer according to one embodiment.

FIG. 1 is a high-level block diagram showing a computer 100 according to one embodiment. Illustrated are at least one processor 102 coupled to a bus 104. Also coupled to the bus 104 are a memory 106, a storage device 108 (which represents both fixed and/or removable storage accessible to the computer), a keyboard 110, a graphics adapter 112, a pointing device 114, and a network adapter 116 for connecting the computer to a network such as the Internet. A display 118 is coupled to the graphics adapter 112. Computers acting in different roles may have different and/or additional elements than the ones shown in FIG. 1. For example, a computer 100 acting as a server may have greater processing power and a larger storage device 108 than a computer acting as a client. Likewise, a computer 100 acting as a server may lack devices such as a display 118 and/or keyboard 110 that are not necessarily required to operate it.

In one embodiment, the computer 100 executes an operating system such as a variant of MICROSOFT WINDOWS or LINUX. The operating system controls the operation of the computer 100. In general, the operating system executes one or more application programs. The operating system and application programs executed by the computer are formed of one or more processes. Files forming the operating system and application programs are stored on the storage device 108.

This description utilizes the term "module" to refer to computer program logic for providing a specified functionality. A module can be implemented in hardware, firmware, and/or software. A module is typically stored on the storage device 108, loaded into the memory 106, and executed by the processor 102. A module can include one or more processes, and/or be provided by only part of a process.

The computer 100 can be infected by various types of malicious software (malware) such as viruses, spyware, and adware. The malware can be introduced to the computer 100 through a parasitic infection, via a Trojan horse program that contains surreptitious functionality, through a worm attacking a vulnerability in an executing process, etc. At its core, the malware infection makes an alteration to the computer 100 that causes the malware to execute. For example, the malware can rewrite a portion of an executable file stored on the storage device 108 to cause it to perform a malicious function whenever the file is executed. Similarly, the malware can hook into the registry-maintained file handler for the JPEG file type to cause the malware to execute every time the end-user accesses a JPEG file. In another example, the malware can overwrite a memory buffer of an executing process to cause execution to pass to malicious instructions. Some malware makes multiple alterations such as altering the registry, creating hidden directories on the storage device 108, and altering executing processes.

The computer 100 executes a security module 120 for protecting the computer 100 from malware. In general, the security module 120 detects malware on the computer and prevents it from executing. In addition, the security module 120 repairs the computer 100 by returning it to the pre-infection state (or as close to this state as is possible). The security module 120 analyzes context information available on the computer 100 to determine the optimal way to repair the computer after a malware infection. For example, if context information indicates that a backup of a virus-infected file is available, the security module 120 may choose to restore a clean copy of the file from the backup, rather than to patch the infected file.

Figure 2:
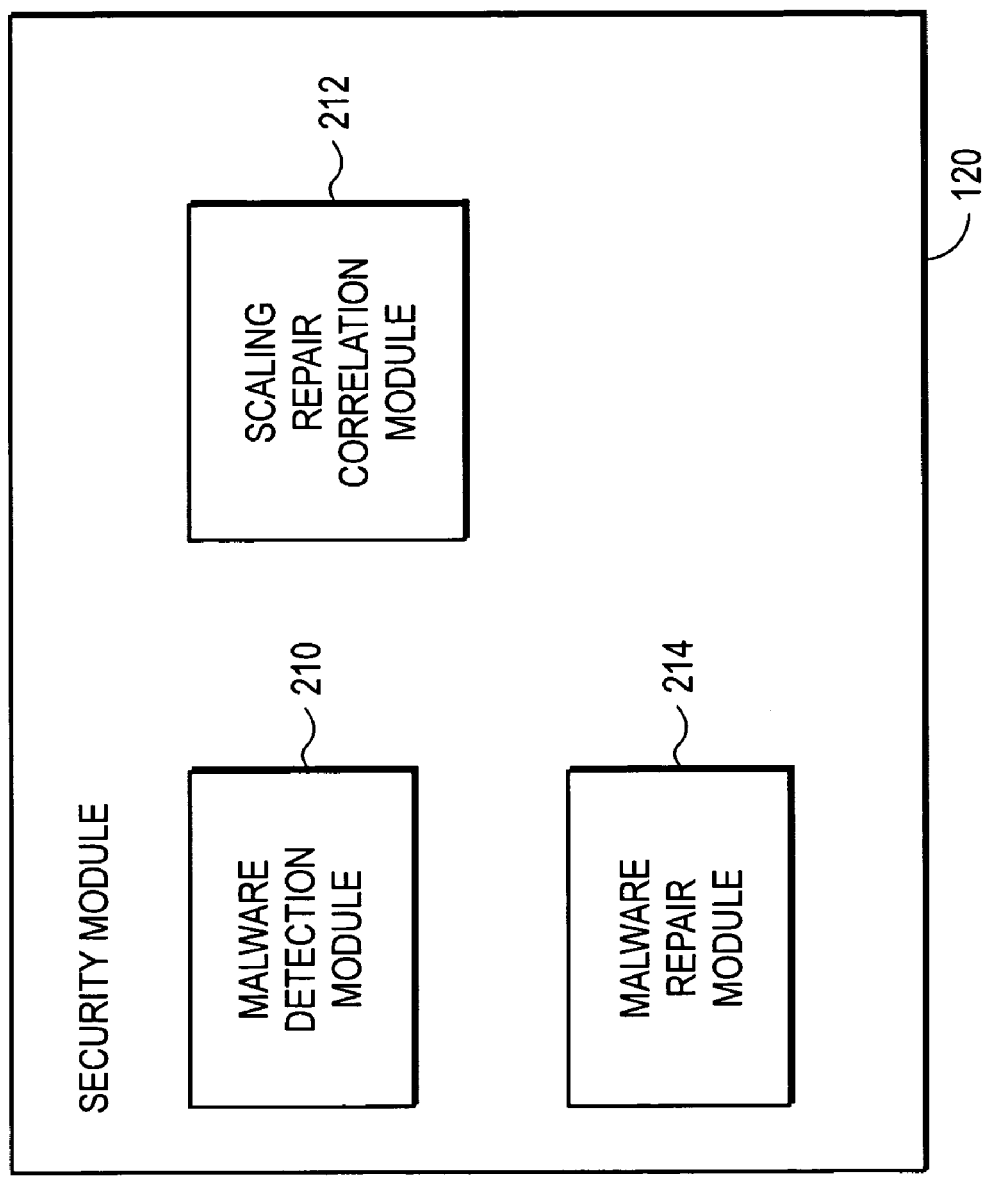
FIG. 2 is a high-level block diagram illustrating modules within a security module according to one embodiment.

FIG. 2 is a high-level block diagram illustrating modules within the security module 120 according to one embodiment. Other embodiments can have additional and/or different modules than the ones shown in the figure. In addition, the functionalities can be distributed among the modules in a manner different than described here. In one embodiment, the security module 210 includes functionality from the NORTON ANTIVIRUS application, available from Symantec Corp. of Cupertino, Calif.

A malware detection module 210 detects malware residing and/or executing on the computer 100. The techniques utilized by the malware detection module 210 depend upon the embodiment and/or the malware. The module 210 detects some malware by scanning files for signatures of known malicious software and/or observing patterns of instructions executed by the malware. It detects other malware by using heuristic algorithms that recognize malicious behaviors. Other embodiments use other techniques to detect malware.

In one embodiment, the malware detection module 210 produces a list of one or more infection objects describing the infections it identifies on the computer 100. An infection object is a data structure that describes a characteristic of the infection. In one embodiment, an infection object includes:

an identifier of the infection (e.g., a value that uniquely identifies the infection;

the type of item infected (e.g., a file, process, or registry key); and an identifier of the infected item (e.g., the path of the infected file, or the process ID of an executing process).

In other embodiments, the malware detection module 210 binds other and/or different information into the infection object.

A single malware infection can cause the malware detection module 210 to generate multiple infection objects. For example, malware that creates a registry key and a file on the storage device 108 can lead to the malware detection module 210 generating one infection object upon detection of the registry key and another object upon detection of the file.

A scaling repair correlation module 212 (the "correlation module") receives the infection objects and produces a list of one or more repair objects. A repair object is a data structure that describes a repair action that can be performed to repair an infection described by one or more infection objects. In most cases, the correlation module 212 produces a variety of repair objects 212 that scale from fine-grained to coarse-grained. A fine-grained repair makes a relatively minor and targeted change to the computer 100 to repair the infection. A coarse-grained repair makes a relatively major and broad-based change to the computer 100 to repair the infection. For example, a fine-grained repair object can describe a surgical excision of malicious software from an infected file. A coarse-grained repair object, in contrast, can describe replacing the infected file with a backup or even reformatting the entire storage device 108.

Depending upon the infection, repair, and/or embodiment, a repair object can have a one-to-one correlation with a particular infection object and/or a repair object can correlate to multiple infection objects. In addition, there can be multiple repair objects for a given infection object. The correlation module 212 produces the repair objects based at least in part on context information available on the computer 100.

In one embodiment, a repair object includes:

an identifier of the repair (e.g., a value that uniquely identifies the repair and/or the module that can effect the repair); and a score of the repair.

The score of a repair object is a metric that can be utilized to evaluate the object's repair against other potential repairs for a given infection object. In one embodiment, the list of repair objects produced by the correlation module 212 is sorted based on the scores.

In one embodiment, a score for a repair object is comprised of a thoroughness metric and a complexity metric. Other embodiments use additional and/or different metrics than the ones described here. The thoroughness metric describes how thorough the repair is at removing the malware. Some repairs might remove all traces of an infection while other repairs might disable the malware but leave traces of it, such as registry keys, on the computer 100. In one embodiment, the thoroughness metric is described by a numeric value. In another embodiment, the metric is instead described by categories such as "complete," "most," "partial," "low," "medium," and "high."

The complexity metric describes how inconvenient a repair is to an end-user of the computer 100. Complexity is determined based on factors such as whether a reboot of the computer is required to effect the repair, whether the repair must delete files from the storage device 108 and/or remove data from files, and the amount of end-user interaction required to carry out the repair. Depending upon the embodiment, the complexity metric is described by numeric values and/or categories.

To understand the scores, consider a sample coarse-grained repair object that reformats the storage device 108 of the computer. This repair object will have maximum values for both thoroughness and complexity because it is likely to remove all traces of a malware infection but will erase large amounts of data and require significant end-user interaction. In contrast, a fine-grained repair object that disables malware by altering a registry key but does not otherwise remove it is likely to have low thoroughness and low complexity because it does not thoroughly remove the malware and also does not erase other data or require end-user interaction.

A malware repair module 214 receives the repair objects from the correlation module 212, selects repair objects based on the scores, and executes the repairs identified by the selected objects. In one embodiment, the malware repair module 214 selects what can be termed the "least painful" repair object for a given infection object. The least painful repair object is the one that has the highest thoroughness and lowest complexity, and can also be described as the finest-grained repair that meets the desired level of thoroughness. In some embodiments, the malware repair module 214 selects the repair object automatically, without interaction with the end-user. Automated selection, for example, can be performed when a high-thoroughness/low-complexity repair object is available. In other embodiments, the malware repair module 214 presents the end-user with a list of repairs identified by the repair objects and allows the end-user to select the repair or repairs to perform. Such end-user interaction can be utilized when all of the repair objects have relatively low thoroughness and/or high complexity metrics. In one embodiment, the malware repair module 214 uses predetermined thresholds to determine whether to execute a repair automatically or to prompt the end-user to select the repair. The malware repair module 214 executes a repair identified by a repair object by activating the repair module 312 that provided the selected repair object.

Figure 3:
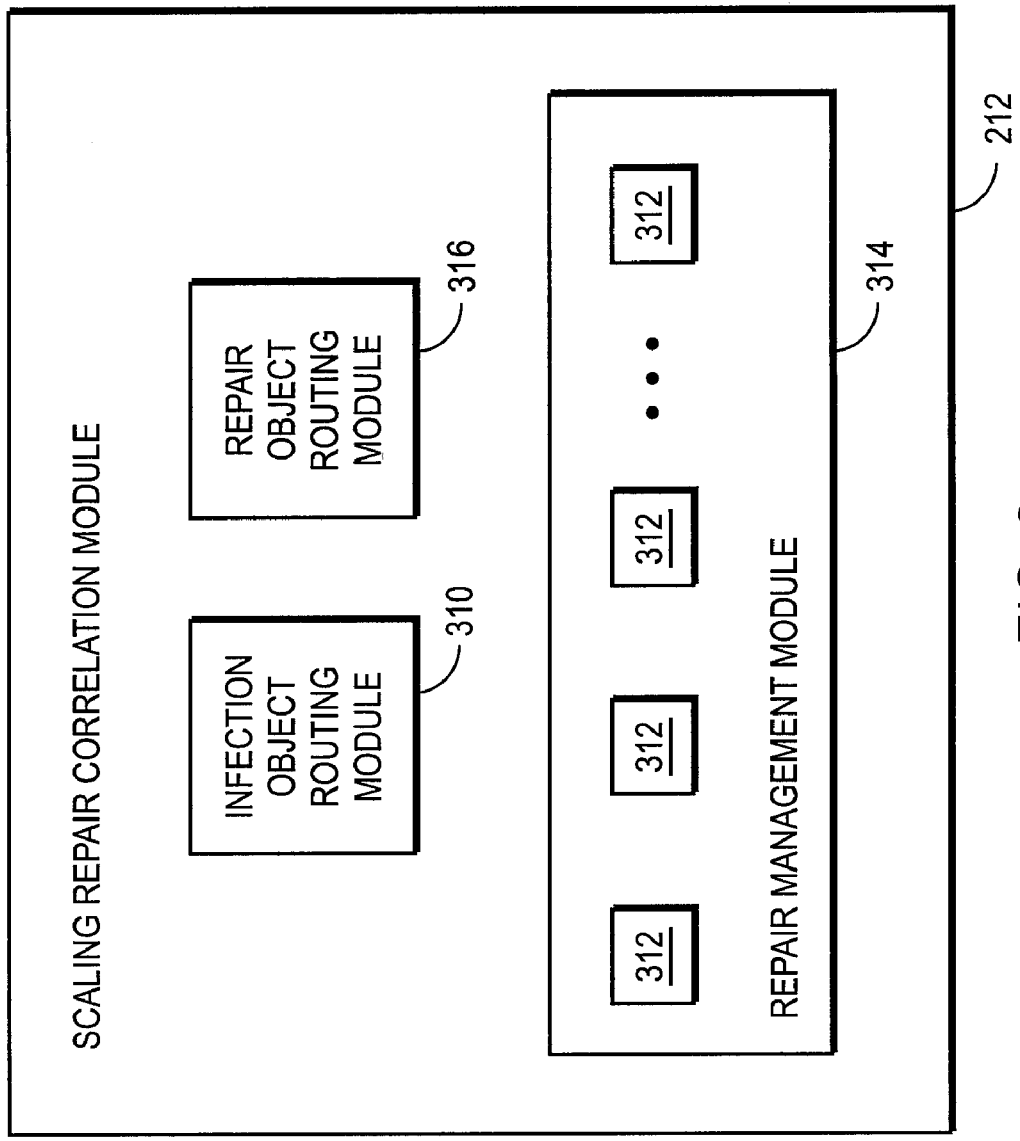
FIG. 3 is a high-level block diagram illustrating a more detailed view of the correlation module of the security module according to one embodiment.

FIG. 3 is a high-level block diagram illustrating a more detailed view of the correlation module 212 according to one embodiment. Other embodiments have additional and/or different modules than the ones shown in the figure. In addition, the functionalities can be distributed among the modules in a manner different than described here.

An infection object routing module 310 receives the list of infection objects and routes the objects to one or more repair modules 312. In one embodiment, the infection object routing module 310 routes the entire set of objects to each repair module 312. In another embodiment, the routing module 310 applies conditional logic to the infection objects and makes routing decisions responsive to the logic and/or the information contained within the infection objects. The conditional logic generally encodes the behaviors of the repair modules 312 with respect to the quantity and/or types of infection objects that the repair modules accept. For example, the conditional logic can indicate that a particular repair module 312 processes individual infection objects, or that it processes multiple objects simultaneously. Similarly, the conditional logic can specify that a particular repair module 312 handles only infection objects for particular types of infections.

The infection object routing module 310 may sort or otherwise reorder the list of infection objects in response to the conditional logic. In one embodiment, the infection object routing module 310 sorts the infection objects based on, e.g., the identity of the infection and/or the type of object infected. In one embodiment, the infection object routing module 310 first routes individual infection objects to the repair modules 312 that act on individual objects, and then routes the entire list of infection objects to the repair modules that simultaneously act on multiple infection objects.

The repair modules 312, in turn, accept the infection objects and produce a list of zero or more repair objects in response. The repair objects describe repairs that the repair modules 312 can perform to remedy a malware infection. In one embodiment, the correlation module 212 has an extensible architecture and supports a variable number of repair modules 312. A repair management module 314 provides an interface to which repair modules 312 can be added and/or removed. In one embodiment, the repair modules 312 are "plug-ins" that can be added and/or removed from the repair management module 314 as may be necessary or desired. In one embodiment, the entity that provides the security module 120 includes an initial set of repair modules 312 in the repair management module 314. As new malware threats are discovered, the entity updates the security module 120 by adding new repair modules 312, removing existing modules, and/or altering the functionality of existing modules. The new repair modules 312 can be provided to the security module 120, for example, through an update process carried out via the Internet or another network.

In one embodiment, each repair module 312 represents, and can perform, a single type of repair. The repair module 312 analyzes the infection objects it receives to determine whether it can repair the infection indicated therein. If the repair module 312 can repair the infection, it produces a repair object having an identifier and score as described above. In one embodiment, the score that a repair module 312 places in a repair object varies dynamically in response to the data in the infection object and/or other factors. For example, a repair module 312 that performs surgical removals of certain different types of viruses might have different thoroughness and/or complexity metrics depending upon the virus. While this description assumes that the repair modules 312 both generate the repair objects and execute the repairs, this dual function is not required. In some embodiments, generating repair objects and performing the repairs are performed by separate modules.

In one embodiment, at least some of the repair modules 312 include functionality allowing the modules to leverage context information available on the computer 100 to identify potentially-optimal repairs for a given infection. Individual repair modules 312 are tailored to determine whether specific types of context information are present and, if so, whether the context information can be used to repair an infection. For example, the context information can include whether a non-infected version of the infected item is available, such as versions of the item created by programs such as GHOST and GOBACK, and by traditional file/folder backup methods. The context information can also include whether the installer for an infected application is available and can be used to repair the infection, the number of infections present on the storage device 108, the source of an infected item (e.g., the application that created an infected file), and/or the file system attributes of the infected item. A set of exemplary repair modules 312 are described here, although it will be understood that some embodiments will have different and/or additional repair modules.

A Backup Retrieval repair module determines whether clean versions of one or more infected items are available. A imaging program such as NORTON GHOST or NORTON GOBACK, both available from Symantec Corp. of Cupertino, Calif., might have been used to image the storage device 108 and/or individual files prior to the infection. The Backup File Retrieval module examines data available on the storage device 108 and/or elsewhere on the computer 100 to determine whether backups of an infected item or items exists. The backups might be present on the storage device 108 itself, in near-line storage, and/or in off-line storage. If activated, the Backup Retrieval module performs the repair operation through library calls to the backup program and/or by launching tools within the backup program that cause the backups to be restored in place of the infected items. In one embodiment, a repair object produced by the Backup Retrieval repair module has a score comprised of "moderate" levels of complexity and thoroughness.

A Non-Essential Item repair module determines whether an infected file or other item is essential to the operation of the computer 100. In one embodiment, this module uses the location of the item on the storage device 108 as an indicator of whether the item is essential. Files in temporary directories, e.g., static directories like "C:\WINDOWS\TEMP" and dynamic directories specified by the operating system application program interfaces (APIs), are considered non-essential and can be safely deleted or quarantined without negatively impacting the operation of the computer 100. Further, one embodiment uses the creator or source of the item on the storage device 108 as an indicator of whether the item is essential. For example, a file that is created by a web browser such as INTERNET EXPLORER is less likely to be essential than a file created by a financial management application such as QUICKEN. In one embodiment, a repair object produced by the Non-Essential Item repair module has a score comprised of "low" levels of complexity and thoroughness.

An Installer repair module determines whether an infected file, registry, and/or other item can be repaired by using installation functionality available on the computer 100. Certain operating systems provide functionality for installing, uninstalling, and/or repairing applications. For example, MICROSOFT WINDOWS includes Installer functionality that provides a resource for installing, uninstalling, and modifying applications. Files used with the Windows Installer have the extension ".MSI" and contain instructions and data in a special format that is understood by the Installer. These .MSI files may be present on the storage device 108 and/or available via the network (as is the case with ActiveDirectory published installations). In non-MSI installations, a custom installation program may reside on the storage device in the application's main directory or a similar location. In one embodiment, the Installer repair module determines whether an infected item can be repaired by retrieving data from the installation (e.g., .MSI) files. For example, the Installer repair module can repair an infected file by retrieving a clean copy of an infected file from an installation file. Similarly, the Installer repair module can repair an infected registry key by analyzing an installation file to ascertain the correct value for the infected key. Further, the Installer repair module can repair an infection by uninstalling and then reinstalling an infected application. In one embodiment, a repair object produced by the Installer repair module has a score comprised of a "moderate" level of complexity and a "high" level of thoroughness.

A Generic Side Effects repair (GSER) module repairs an infected item by resetting the infected item to its default condition (regardless of whether the item was in the default state prior to the repair). For example, assume that some malware hooks into the computer 100 by altering the JPEG file handler in the operating system's registry to a value that calls the malware instead of the intended JPEG handler. The GSER module can disable this malware by restoring the JPEG file handler to the default value specified by the operating system. In one embodiment, a repair object produced by the GSER module has a score comprised of a "moderate" level of complexity and a "low" level of thoroughness.

A Scripted repair module repairs an infected item by performing a pre-specified scripted repair on the item. In one embodiment, the entity that provides the scripted repair module produces a set of one or more scripted actions that repair particular types of malware infections. For example, a script can be tailored to remove a particular type of virus from an executable file. The score of a repair object produced by the Scripted repair module depends upon the infection and/or script.

A Massive Infection repair module acts on multiple infection objects simultaneously and repairs a massive infection by restoring the entire storage device 108 (or part of the storage device, such as a partition) from a backup image. In some embodiments, the Massive Infection repair module repairs a massive infection by reformatting the storage device 108 or otherwise wiping it clean of both infected and non-infected items. The repair actions performed by the Massive Infection repair module are the least granular of the actions described herein but can often provide far more desirable results. For a computer 100 that has not had a security module 120 running and is massively infected, resorting to an available disk image to revert to an earlier state is far faster and easier in most cases than attempting to repair every infection. In one embodiment, a repair object produced by the Massive Infection repair module has a score comprised of "high" levels of complexity and thoroughness.

A repair object routing module 316 in the correlation module 212 receives the repair objects from the repair modules 312. In one embodiment, this routing module 316 ranks the repair objects by score, making repair objects having high thoroughness and low complexity the highest-ranked. Other embodiments use other criteria for ranking. The repair object routing module 316 provides the ranked repair objects to the malware repair module 214, so that the latter module can evaluate the repair objects and select the best one(s) for execution.

Figure 4:
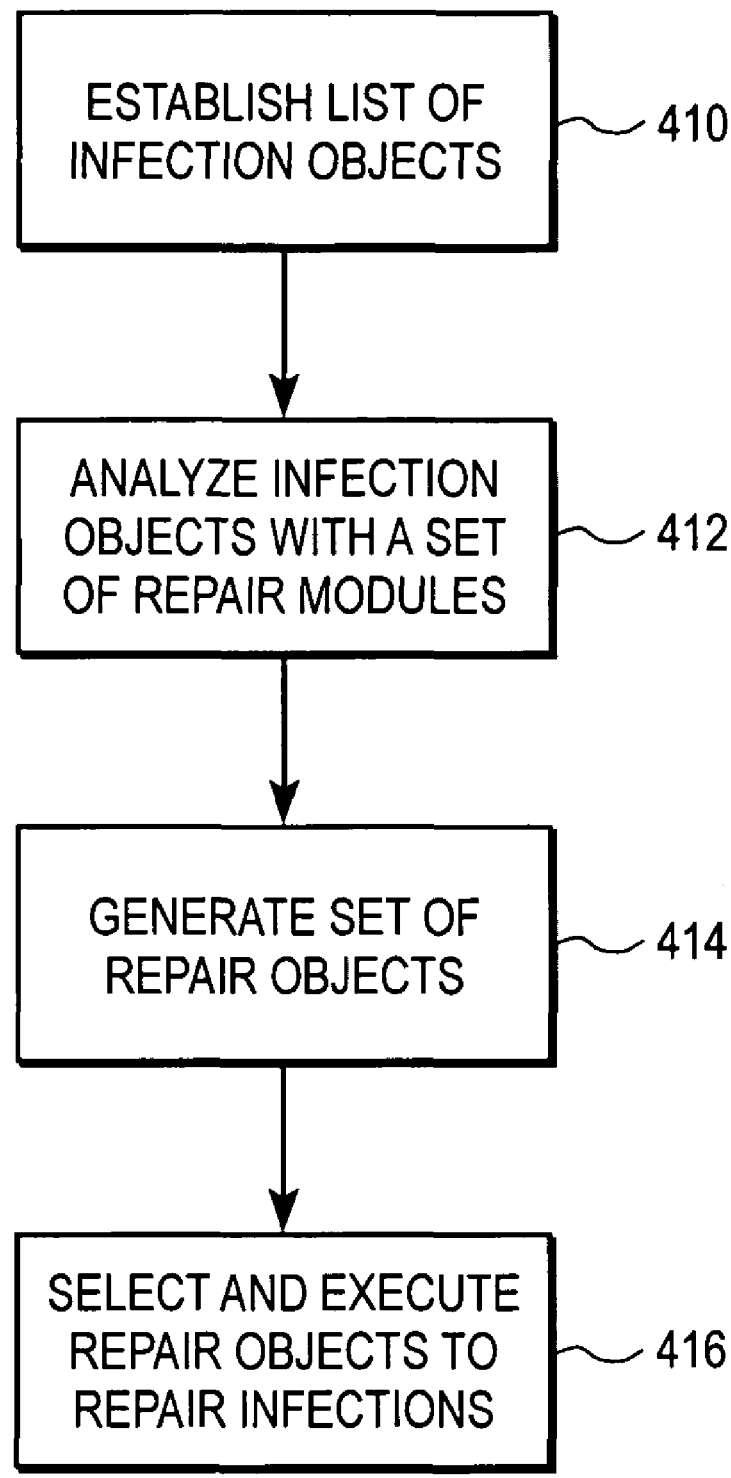
FIG. 4 is a flow chart illustrating steps performed by the security module according to one embodiment.

FIG. 4 is a flow chart illustrating steps performed by the security module 120 according to one embodiment. Other embodiments can perform different and/or additional steps, and/or perform the steps in different orders. Further, the steps can be performed by modules other than the security module 120.

The security module 120 establishes 410 a list of infection objects. The security module 120 can establish the list by performing a full scan to identify any malware on the storage device 108, by monitoring activities performed on the computer 100 and scanning each accessed file for the presence of malware, by observing executing processes for suspicious behaviors and scanning those processes, etc. Essentially any technique that identifies a malware infection can be utilized.

Once a set of infection objects is established, the security module 120 analyzes 412 the infection objects using a set of scaling repair modules 312. In one embodiment, the security module 120 first sends the individual infection objects to fine-grained repair modules that act on individual infections, and then sends the list of infection objects to coarse-grained repair modules that act on multiple infections. In other embodiments, the security module 120 sends the infection objects to the repair modules 312 in different orders, and/or sends the infection objects to both fine- and coarse-grained repair modules concurrently.

The repair modules 412, in turn, generate 414 a set of repair objects. Each repair object represents a repair that a repair module can perform to resolve an infection described by one or more infection objects. In one embodiment, the repair modules 412 utilize context information available on the computer 100 to generate the repair objects. The repair objects are scaled in the sense that some repair objects represent fine-grained repairs while other repair objects represent coarse-grained repairs. The repair objects contain scores describing the complexity and thoroughness of the repairs, and in one embodiment the security module 120 ranks the repair objects by score.

The security module 120 evaluates the repair objects and selects 416 certain ones to execute. The security module 120 can select the repair objects automatically, in response to end-user input, and/or through a combination of these techniques. In one embodiment, the security module 120 applies a threshold to the complexity and/or thoroughness metrics of the repair objects to determine whether to perform repairs automatically or to solicit input. The security module 120 executes the selected repairs by activating the associated repair modules 312.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer system for generating options for repairing a computer infected by malicious software, the system comprising:
   an infection object routing module adapted to receive a set of infection objects describing malicious software infections detected on the computer and to selectively provide the infection objects to a set of repair modules;
   a repair management module adapted to interface with the set of repair modules, each repair module adapted to:
      receive at least one of the infection objects describing a malicious software infection on the computer,
      determine whether the repair module can repair the infection described by the infection object, and responsive to a positive determination, generate a repair object representing a repair that the repair module can perform, the repair object generated including a score describing a metric of thoroughness and complexity of the repair;
   a repair object routing module adapted to receive a plurality of the repair objects generated by the repair modules responsive to the provided infection objects; and
   a malware repair module adapted to select, for each infection object, one of the plurality of repair objects generated by the set of repair modules based on the scores of the plurality of the repair objects or on input from an end user of the computer regarding a repair represented by one of the plurality of repair objects.

2. The system of claim 1, wherein the repair object routing module is further adapted to rank the repair objects based on their scores.

3. The system of claim 1, wherein at least one of the repair modules is adapted to generate the score for the repair object describing the metric, wherein the metric comprises:
   a thoroughness metric describing how thorough the repair represented by the repair object is in repairing the infection described by the infection object; and
   a complexity metric describing a complexity of the repair represented by the repair object.

4. The system of claim 1, wherein the repair management module is adapted to interface with at least one of the repair modules that analyzes context information about the computer to determine whether it can repair the infection described by the infection object.

5. The system of claim 4, wherein the context information is one or more types of context information selected from the set consisting of:
   information describing whether a non-infected version of an infected item is available to be restored in place of the infected item;
   information describing whether an installer is available to repair the infection described by the infection object;
   information describing a number of infections present on the computer;
   information describing the source of the infected item; and
   information describing file system attributes of the infected item.

6. The system of claim 1, wherein the malware repair module is further adapted to select one or more of the repairs represented by the repair objects responsive to the scores satisfying a threshold.

7. A computer program product having a computer-readable medium having tangibly embodied therein computer program instructions for generating options for repairing a computer infected by malicious software, comprising:
   an infection object routing module adapted to receive a set of infection objects describing malicious software infections detected on the computer and to selectively provide the infection objects to a set of repair modules;
   a repair management module adapted to interface with the set of repair modules, each repair module adapted to:
      receive at least one of the infection objects describing a malicious software infection on the computer,
      determine whether the repair module can repair the infection described by the infection object, and responsive to a positive determination, generate a repair object representing a repair that the repair module can perform, the repair object generated including a score describing a metric of thoroughness and complexity of the repair;
   a repair object routing module adapted to receive a plurality of the repair objects generated by the repair modules responsive to the provided infection objects; and
   a malware repair module adapted to select, for each infection object, one of the plurality of repair objects generated by the set of repair modules based on the scores of the plurality of the repair objects or on input from an end user of the computer regarding a repair represented by one of the plurality of repair objects.

8. The computer program product of claim 7, wherein the repair object routing module is further adapted to rank the repair objects based on their scores.

9. The computer program product of claim 7, wherein at least one of the repair modules is adapted to generate the score for the repair object describing the metric, wherein the metric comprises:
   a thoroughness metric describing how thorough the repair represented by the repair object is in repairing the infection described by the infection object; and
   a complexity metric describing a complexity of the repair represented by the repair object.

10. The computer program product of claim 7, wherein the repair management module is adapted to interface with at least one of the repair modules that analyzes context information about the computer to determine whether it can repair the infection described by the infection object.

11. The computer program product of claim 10, wherein the context information is one or more types of context information selected from the set consisting of:
   information describing whether a non-infected version of an infected item is available to be restored in place of the infected item;
   information describing whether an installer is available to repair the infection described by the infection object;
   information describing a number of infections present on the computer;
   information describing the source of the infected item; and
   information describing file system attributes of the infected item.

12. The computer-program product of claim 7, wherein the malware repair module is further adapted to select one or more of the repairs represented by the repair objects responsive to the scores satisfying a threshold.

13. A computer-implemented method for generating options for repairing a computer infected by malicious software, comprising:
- receiving a set of infection objects describing malicious software infections detected on the computer;
- selectively providing the infection objects to a set of repair modules;
- interfacing with a set of repair modules, each repair module adapted to:
  - receive at least one of the infection objects describing a malicious software infection on the computer,
  - determine whether the repair module can repair the infection described by the infection object, and responsive to a positive determination, generate a repair object representing a repair that the repair module can perform, the repair object generated including a score describing a metric of thoroughness and complexity of the repair;
- receiving a plurality of the repair objects generated by the repair modules responsive to the provided infection objects; and
- selecting, for each infection object, one of the plurality of repair objects generated by the set of repair modules based on the scores of the plurality of repair objects or on input from an end user of the computer regarding a repair represented by one of the plurality of repair objects.

14. The method of claim 13, further comprising:
ranking the repair objects based on their scores.

15. The method of claim 13, wherein the metric of thoroughness and complexity of a score comprising:
- a thoroughness metric describing how thorough the repair represented by the repair object is in repairing the infection described by the infection object; and
- a complexity metric describing a complexity of the repair represented by the repair object.

16. The method of claim 13, wherein the interfacing comprises:
- interfacing with at least one of the repair modules that analyzes context information about the computer to determine whether it can repair the infection described by the infection object.

17. The method of claim 16, wherein the context information is one or more types of context information selected from the set consisting of:
- information describing whether a non-infected version of an infected item is available to be restored in place of the infected item;
- information describing whether an installer is available to repair the infection described by the infection object;
- information describing a number of infections present on the computer;
- information describing the source of the infected item; and
- information describing file system attributes of the infected item.

18. A computer system for generating options for repairing a computer infected by malicious software, the system comprising:
- infection object routing means adapted to receive a set of infection objects describing malicious software infections detected on the computer and to selectively provide the infection objects to a set of repair modules;
- repair management means for interfacing with the set of repair modules, each repair module adapted to:
  - receive at least one of the infection objects describing a malicious software infection on the computer,
  - determine whether the repair module can repair the infection described by the infection object, responsive to a positive determination, generate a repair object representing a repair that the repair module can perform, the repair object generated including a score describing a metric of thoroughness and complexity of the repair object routing means for receiving a plurality of the repair objects generated by the repair modules responsive to the provided infection objects; and
- malware repair means for selecting, for each infection object, one of the plurality of repair objects generated by the set of repair modules based on the scores of the plurality of repair objects or on input from an end user of the computer regarding a repair represented by one of the plurality of repair objects.

* * * * *